United States Patent [19]
Kitta et al.

[11] Patent Number: 5,367,150
[45] Date of Patent: Nov. 22, 1994

[54] DATA PROCESSING SYSTEM USING IC CARD

[75] Inventors: Kenichi Kitta, Toride; Kunihiro Okada, Yokohama; Mitsuo Mimura, Toride; Makoto Ochiai, Oyama; Naotake Nakamura, Kashiwa, all of Japan

[73] Assignee: Hitachi Maxell, Ltd., Ibaraki, Japan

[21] Appl. No.: 917,678

[22] PCT Filed: Sep. 25, 1989

[86] PCT No.: PCT/JP89/00970

§ 371 Date: May 22, 1990

§ 102(e) Date: May 22, 1990

[87] PCT Pub. No.: WO90/03607

PCT Pub. Date: Apr. 5, 1990

Related U.S. Application Data

[63] Continuation of Ser. No. 490,598, May 22, 1990, abandoned.

[30] Foreign Application Priority Data

Sep. 26, 1988 [JP] Japan ................. 63-240257
Sep. 26, 1988 [JP] Japan ................. 63-240258
Nov. 21, 1988 [JP] Japan ................. 63-294035

[51] Int. Cl.5 .......................................... G06F 15/30
[52] U.S. Cl. ........................ 235/380; 235/379; 902/40
[58] Field of Search ............... 235/441, 375, 379, 380, 235/381, 382; 902/20, 24, 26, 40; 364/406, 408, 405

[56] References Cited

U.S. PATENT DOCUMENTS

| 3,845,277 | 10/1974 | Voss et al. | 902/20 X |
| 4,114,027 | 9/1978 | Slater et al. | 902/40 X |
| 4,197,986 | 4/1980 | Negata | 902/20 X |
| 4,614,861 | 9/1986 | Pavlov et al. | 235/380 |
| 4,630,196 | 12/1986 | Bednar, Jr. et al. | 364/200 |
| 4,709,136 | 11/1987 | Watanabe | 235/379 |
| 4,709,137 | 11/1987 | Yoshida | 235/379 |
| 4,961,142 | 10/1990 | Elliott et al. | 902/26 X |
| 4,982,323 | 1/1991 | Nakamura | 235/380 |
| 4,983,816 | 1/1991 | Iijima | 235/380 |

FOREIGN PATENT DOCUMENTS

| 0114368 | 8/1984 | European Pat. Off. | 235/379 |
| 0159530 | 10/1985 | European Pat. Off. | 235/379 |
| 0256768 | 2/1988 | European Pat. Off. | |
| 0368752 | 5/1990 | European Pat. Off. | |
| 60-181887 | 9/1985 | Japan | 235/379 |
| 60-220464 | 11/1985 | Japan | 235/379 |
| 61-134871 | 6/1986 | Japan | |
| 61-143871 | 7/1986 | Japan | |
| 62-293469 | 12/1987 | Japan | |
| 63-118873 | 5/1988 | Japan | |
| WO85/04742 | 10/1985 | WIPO | 235/379 |

*Primary Examiner*—Davis L. Willis
*Assistant Examiner*—Edward Sikorski

[57] ABSTRACT

An IC card (24) and a data memory card (23) are mounted to a terminal equipment (1) connected to a center computer (32) via a line. Confirmation information stored in the IC card is checked whether or not it coincides with confirmation information stored in an RAM (6) in the terminal equipment or confirmation information stored in the data memory card. After coincidence of the confirmation information is detected, the terminal equipment performs the processing to be conventionally performed by the center computer in place of the center computer. An IC card intake and outtake processing mechanism (104) in the terminal equipment does not send out the IC card to the outside of the terminal equipment when the power of the terminal equipment is shut down.

16 Claims, 11 Drawing Sheets

| | | |
|---|---|---|
| ATTRIBUTE INFORMATION | CARD IDENTIFICATION CONFIRMATION INFORMATION | 24a |
| DIRECTORY | BUSINESS DEFINING INFORMATON | 24b |
| CARD OWNER ATTRIBUTE INFORMATION | CARD OWNER CONFIRMATION INFORMATION | 24c |
| | CARD OWNER ATTRIBUTE INFORMATION | 24d |
| DATA SECTION | BUSINESS INHERENT INFORMATION | 24e |

24

DATA PROCESSING SYSTEM USING IC CARD

This application is a continuation of application Ser. No. 07/490,598 filed on May 22, 1990, now abandoned.

TECHNICAL FIELD

The present invention relates to a data processing system using an IC card, and more particularly, to a data processing system in which the IC card is mounted to a terminal connected to a center computer in a financial institution via a communication line and in which data processing is performed.

BACKGROUND ART

Many computer terminals, which are installed in a financial institution, e.g., a bank for business use, are connected to a center computer via private lines. Conventionally, data processing such as payment, transfer, withdrawal of deposit, or deposit is performed by utilizing data communication between the center computer and each terminal.

In this case, each terminal, which is installed at a business department of the financial institution, is operated by employees, and a so-called general purpose personal computer is generally used as the terminal.

Recently, a data processing system has been proposed and developed, in which a customer directly operates a terminal by way of an IC card, which the customer owns, from the home or in a financial institution, and in which data processing such as payment, transfer, deposit, automatic withdrawal of the deposit, or check of the balance of accounts is performed by a computer.

In the above case, if the terminal, which is installed at the home or in the financial institution, is such a general purpose personal computer as described above, anybody can access data. Therefore, there can be the great possibility that the data is damaged or the important data is read out and fraudulently used.

For the above reason, it can be considered that a dedicated terminal be provided. In such case, however, there is a problem in that the number of dedicated terminals connected to a center computer becomes greater than in a conventional system.

In order to cope with the increase in the number of dedicated terminals connected to the center computer, the center computer having a large processing capability which can correspond to the many dedicated terminals may be introduced. However, there is a problem in that great cost is required and a conventional computer system must be wasted. In addition, it has been considered that an intermediate apparatus for processing data from the many terminals be provided. However, there is a problem in that the data processing system becomes complicated.

DISCLOSURE OF INVENTION

The present invention is made in order to overcome the problems in the above conventional technique. An object of the present invention is to provide a data processing system using an IC card, by which the load of a center computer can be decreased.

Another object of the present invention is to provide a data processing system using an IC card, in which security of data can be increased.

A terminal, itself, performs the same data processing that a center computer conventionally performs, when a user inserts an IC card into the terminal, and then transmits the processing results to the center computer. Therefore, the load of the center computer for the data processing can be decreased.

As a result, many terminals can be connected to the center computer to perform the data processing. Also, the data processing system can be configured such that a storage medium such as a memory card can be mounted to the terminal, and that programs for the data processing performed by the terminal in place of the center computer can be stored in the storage medium. With such a configuration, each time that data processing is performed, the programs required for the data processing can be selected from among the programs stored in the storage medium and loaded into the terminal. Therefore, even a terminal having a small capability for home use can perform the data processing.

In addition, a part of information to be stored in the IC card may be stored in an internal memory of the terminal or the storage medium. In such a case, the data processing system can be configured such that data communication with the center computer can be performed only when the terminal, the storage medium, and the IC card are combined with each other by a user, and thereby security of data can be increased.

BRIEF DESCRIPTION OF DRAWINGS

FIG. 5 is a flow chart for explaining an operation of the data processing system shown in FIG. 4 when the power of the terminal is turned on;

BEST MODE FOR CARRYING OUT THE INVENTION

Embodiments of the present invention will be described below with reference to the accompanying drawings.

Figure 1:
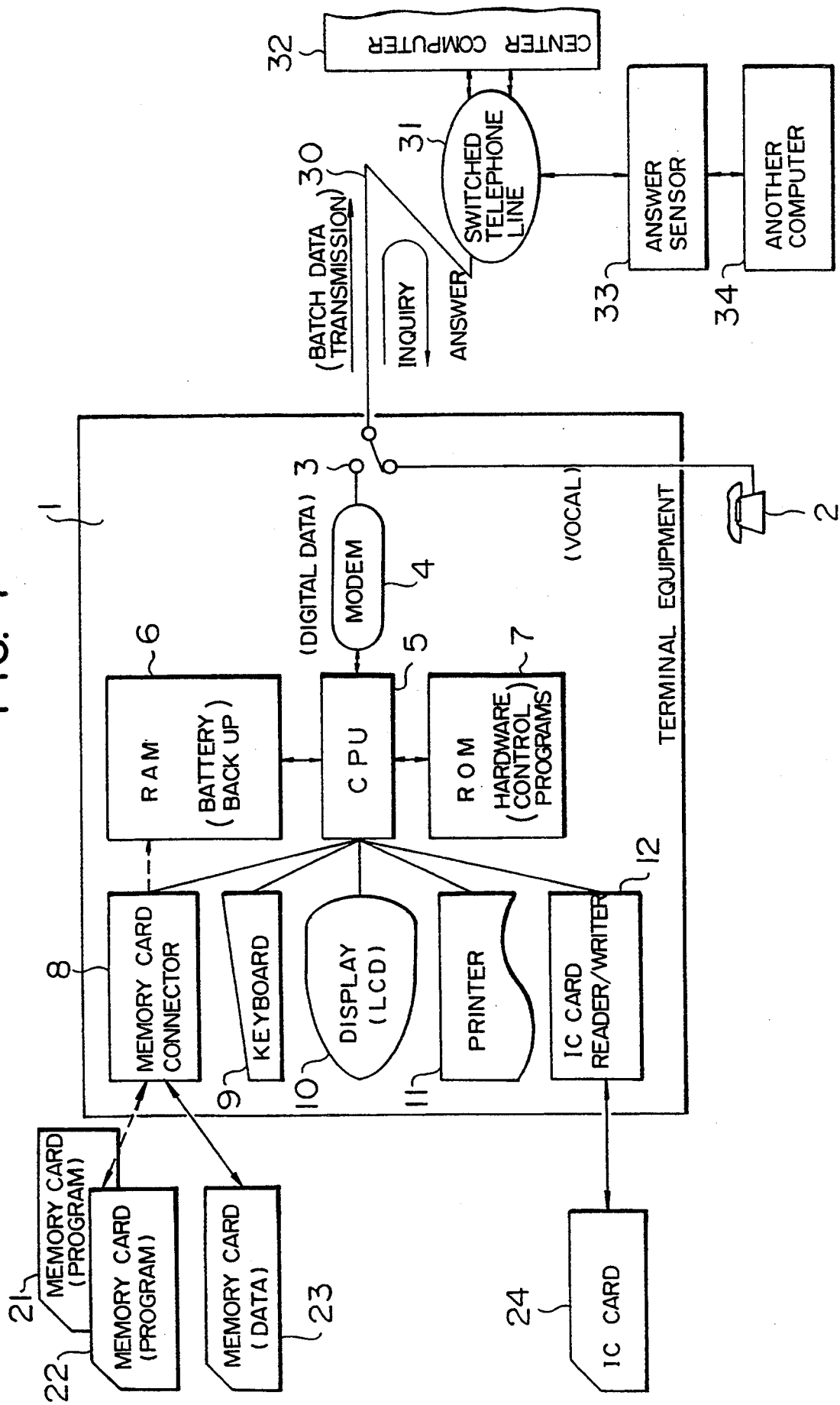
FIG. 1 is a block diagram showing an arrangement of a first embodiment of a data processing system using an IC card, to which system the present invention is applied.
Figure 2:
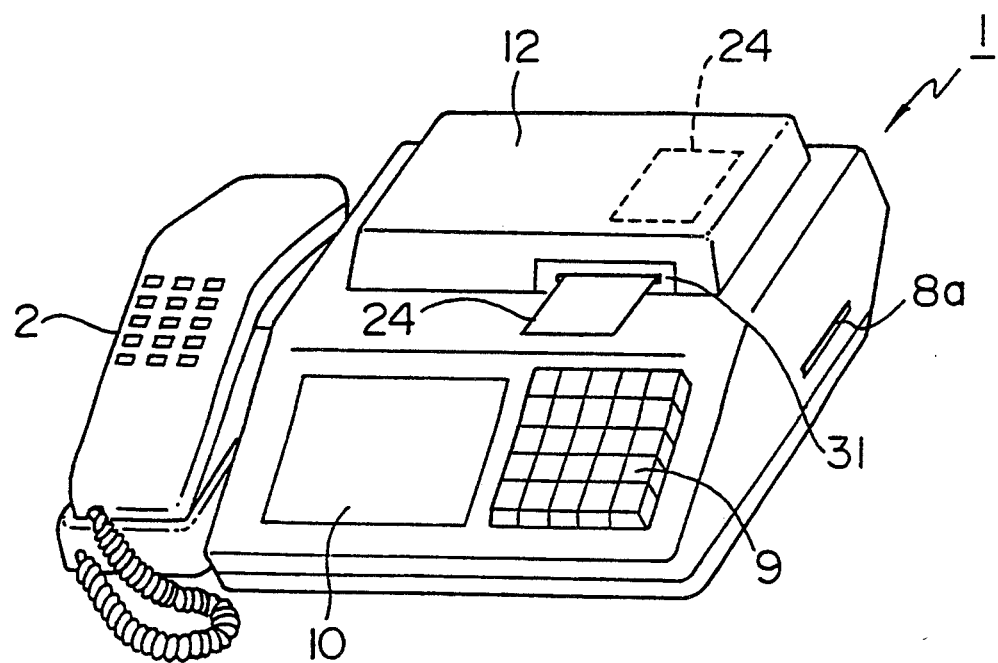
FIG. 2 is an illustration of the appearance of a terminal in the data processing system shown in FIG. 1.

FIG. 1 is a block diagram showing an arrangement of an IC card data processing system according to a first embodiment to which the present invention is applied. FIG. 2 is an illustration of the external appearance of a terminal in the system. FIG. 3 are memory maps for explaining information stored in an IC card and a memory card.

In FIGS. 1 and 2, numeral 1 indicates a terminal with a telephone, the telephone 2 being selectively connected to a line 30 via a switch 3, which can be operated through the telephone 2 or externally.

The switch 3 is usually switched to a telephone 2 side so that the telephone 2 is connected to a center computer 32 or the like through a switched telephone line 31. As a result, an operator can access by the telephone 2 the center computer 32 via the switched telephone line 31 and another computer 34 via the switched telephone line 31 and an answer sensor 33. Here, the center computer 32 and the another computer 34 can communicate guidance and response with the telephone 2 by way of vocal, respectively.

It is assumed that the telephone 2 is operated by a subscriber owning the IC card so that the switch 3 is switched from the telephone 2 side to a terminal 1 side in response to the operation.

Thus, a terminal 1, which has a microprocessor (CPU) 5 in the inside, is connected to the line 30 by the switch 3. The CPU 5 performs data processing on the basis of information received from an IC card 24 or information stored in RAM 6 or ROM 7 and exchanges the processing results with the center computer 32 via a modem 4, the line 30, and the switched telephone line 31.

The terminal 1 is mainly constituted by the RAM 6 which can be accessed by the CPU 5 and which is backed up by a battery, the ROM 7 for storing control programs for the data processing by the CPU 5, a memory card connector 8 to which memory cards 21, 22, and 23 are connected, a keyboard 9, an LCD display 10 for displaying guidance of an operation procedure or processing results, a printer 11 as a journal output, and an IC card reader/writer 12, in addition to the CPU 5 and the modem 4.

There are stored in the ROM 7 the processing programs such as a processing program for reading out processing programs or data from the connected memory cards 21, 22, or 23 and storing them in a predetermined storage area of an address space of the RAM 6, a processing program for exchanging data between each memory card and the terminal 1, a processing program for exchanging data between the IC card and the terminal 1 via the IC card reader/writer 12, a processing program for display processing on the LCD display 10, and a processing program for output processing to the printer 11.

The program memory cards 21 and 22 are for storing the processing programs and the data memory card 23 is for storing the data. These memory cards 21, 22, and 23 are mounted to the terminal 1 via the memory card connector 8. When at least one of these memory cards is mounted, an operator can operate a predesignated specific function key board or input a predesignated code via the keyboard 9. In response thereto, a specific processing program stored in the memory card 21 or 22 or specific data stored in the memory card 23 are loaded into a predetermined storage area of the RAM 6 in the terminal 1 by the CPU 5.

Each processing program stored in the program memory card 21 or 22 is required when the CPU 5 performs the same processing that the center computer 32 conventionally performed on the basis of information obtained from the IC card 24. In response to information which is inputted from the keyboard 9 in accordance with guidance on the LCD display 10, the memory card 21 or 22 is selectively attached, and the required processing program is loaded at the predetermined storage area of the RAM 6 in the terminal 1. In accordance with the loaded processing program, the CPU 5 performs a part or all of the data processing, which is conventionally performed by the center computer 32, on the basis of the information obtained from the IC card 24, and information representing the processing results is stored in the RAM 6.

The IC card 24 is for storing confirmation information such as a secret identification code for identifying an issuer or an owner of the card, or the like, such as, information representing an address and name of the owner, information representing the term of validity, information representing the number of times of errors, and business identification information (a business ID). Dealing or processing data such as an account number and the balance of accounts or various items of business data are stored in a conventional IC card but not stored in the IC card 24. In place of the processing data, access information for accessing the RAM 6 and reading out the processing data from the RAM 6 is stored in the IC card 24. It is assumed that the term "processing data" in this specification includes the various items of business data hereinafter. The processing data such as the account number and the balance is stored and managed in the data memory card 23, and is transmitted to and stored in the RAM 6. The balance may be stored in the IC card in addition to the data memory card or only in the IC card 24.

When the IC card 24 is mounted to the IC card reader/writer 12 in the terminal 1 by a user and confirmation information, e.g., a secret identification number of the user is inputted from the keyboard 9 by the user, the confirmation information is transmitted to the IC card 24 via the IC card reader/writer 12 by the CPU 5. An internal CPU (not shown) of the IC card 24 compares the confirmation information transmitted from the CPU 5 with confirmation information stored in the inside and, as a result of the comparison, transfers a response signal representing coincidence or noncoincidence between both sets of confirmation information to the CPU 5. When the response signal represents the coincidence, the CPU 5 in the terminal equipment 1 permits the IC card 24 to access information stored in the RAM 6. New information is synthesized from the information accessed by the IC card 24 and information stored in the IC card 24 and the synthesized information is transferred to the RAM 6 in the terminal 1. Note that there may be a case where the IC card 24 does not access the information stored in the RAM 6 and transmits only information for designating the information in the RAM 6, e.g., item data, to the terminal 1. In such a case, the terminal 1 performs the data processing in the inside on the basis of the information transmitted from the IC card 24.

In accordance with the processing program which is read out from the program memory card 21 or 22 and stored in the RAM 6, the CPU 5 in the terminal 1 performs the data processing, which is the same that the center computer 32 conventionally performs, for the synthesized information transmitted from the IC card 24 and information stored in the RAM 6. The CPU 5 converts information representing the processing results into information having a predetermined transfer format to transfer the same to the center computer 32.

When the processing result information thus converted by the terminal 1 is transferred to the center computer 32 via the modem 4, the line 30, and the switched telephone line 31, the center computer 32 performs predetermined processing in accordance with the processing result information received from the terminal 1 to transfer the processing result to the terminal 1.

Note that, though the comparing operation for determining whether or not the transmitted confirmation information coincides with the stored confirmation information is performed in the IC card 24 in the above example, this operation may be performed in the terminal 1 after the terminal 1 receives the corresponding confirmation information from the IC card 24. In addition, the confirmation information input from the keyboard 9 may be converted into information coded by way of a scramble conversion or the like and transmitted to the IC card 24.

The information accessed by the IC card 24 or information written from the IC card 24 into the RAM 6 is information concerning the processing data required for the data processing, the processing data stored in the RAM 6 including the account number and the balance of accounts. This information may be stored in the program memory card 21 or 22 as internal information and loaded from such cards into the RAM.

Figures 3A, 3B:
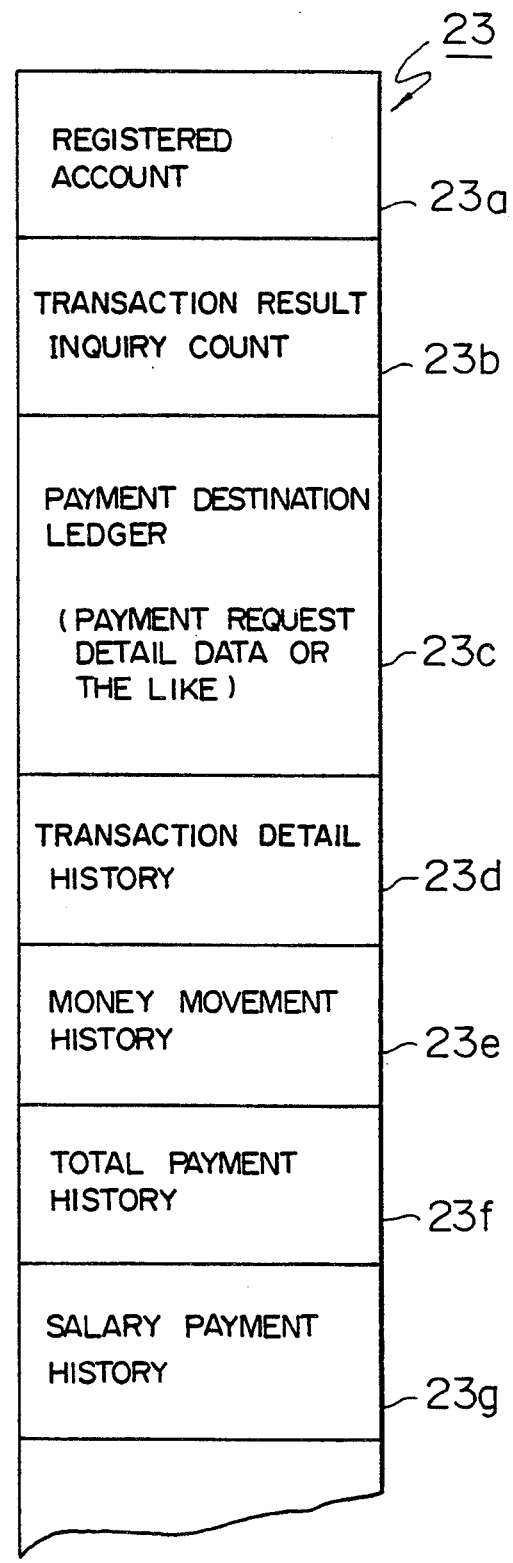
FIG. 3A is a memory map showing information stored in the IC card which is used in the data processing system shown in FIG. 1.
FIG. 3B is a memory map showing information stored in a memory card which is used in the data processing system shown in FIG. 1.

FIG. 3A illustrates the internal information stored in the IC card 24. The IC card 24 has storage areas of attribute information, a directory, card owner attribute information, and a data section. In the attribute information storage area is stored card identification confirmation information 24a such as an identification number of a manufacturer, an issuer or the like of the IC card 24, and a password of a user. In the directory storage area is stored business defining information 24b, which is required to access information stored in the memory card 23, such as information for discriminating a business, a start address of business information, and a user identification number. In the card owner attribute information storage area are stored card owner confirmation information 24c and card owner attribute information 24d. The information 24c is such as the term of validity, the number of times of errors, and so-called personal identification information (personal IDs) concerning persons who can use the IC card, including confirmation information concerning persons such as a owner's family or persons in charge of the account who can use the IC card 24. The card owner attribute information 24d is identification information (ID) concerning a person who is an owner of the IC card, such as an address, a name, and a telephone number of the person, and the term of validity. In the data section storage area is stored business inherent information 24e corresponding to selectable types of businesses.

As shown in FIG. 3B, the memory card 23 of the memory cards 21 to 23 has storage areas of a registered account 23a, a transaction result inquiry count 23b, a payment destination ledger 23c, a transaction detail history 23d, a money movement history 23e which is recorded in response to each dealing, a total payment history 23f, and a salary payment history 23g, which are to be stored in the IC card 24, for all the users, who can use the IC card 24, including the owner of the IC card 24. These storage areas are arranged for each user registered in the IC card 24 in the memory card 23 in accordance with access address information, e.g., a start address and a data length.

Since each card is configured as described above, the IC card 24 can access the RAM 6 to obtain required item data of the information stored in the data memory card 23 or can designate the item data in the RAM 6 in accordance with the confirmation information input, to the terminal 1, the code information to be manipulated at the time, the business defining information, and the business inherent information. Accessed information obtained from the terminal 1 is manipulated by the IC card 24. The manipulated information is converted to have the predetermined format and transferred from the terminal 1 to the center computer 32.

Thus, since a part of information to be stored in the IC card 24 is stored in the memory card 23, a data transfer operation from the terminal 1 to the center computer 32 cannot be performed unless the corresponding memory card is mounted, even though a false or valid IC card is mounted and used. Therefore, security of data can be increased.

Even if a part of data to be stored in the IC card is not stored in the memory card 23 in a separate manner as described above, security of data can be increased. This is true as a part of information necessary for the IC card may be stored directly in the internal memory (RAM 6) of the terminal 1 so that the IC card can access or designate the part to form new information. That is, this is a reason why the terminal 1 cannot be used, unless the IC card obtains the processing program for obtaining the necessary information part or the information part by accessing the internal memory of the terminal 1 or designating the processing program or the information part, even if the identification number such as a secret identification number of the IC card 24 is stolen and fraudulently used.

As described above, in the first embodiment, the access information for the IC card is loaded from the memory card into the internal memory of the terminal. However, processing may be performed in which the CPU in the terminal directly accesses the memory card or designates the information required by the IC card to load the information and transfers the information to the IC card each time information is required.

Note that, if the information to be accessed by the IC card is stored in the internal memory of the terminal from the beginning, it is not necessary to load the information from the memory card into the internal memory. In this case, the memory card can be omitted. In addition, the information to be accessed by the IC card or the processing program to be loaded from the memory card may be loaded from the center computer into the internal memory of the terminal. Further, when the program memory cards and the data memory card are used, these cards can be taken away from the terminal and managed separately, as the matter of course, and hence security can be increased.

In this embodiment, a part of the information to be stored in the IC card is stored in the internal memory of the terminal or the memory card mounted to the terminal, the information part is designated or accessed by the IC card, and information to be transmitted to the center computer is formed from the information part. As a result, even if internal information of the IC card is known by a fraudulent user, the user cannot perform the data transfer from the terminal to the center computer via the line by using a false IC card to obtain necessary information or perform the data processing, since the information stored in the internal memory of the terminal is not known. Therefore, security of data manipulated between the IC card and the terminal can be increased.

In particular, if a part of the information required by the IC card and stored in the internal memory of the terminal is stored in the memory card, data exchange cannot be performed between the IC card and the center computer via the terminal, insofar as the IC card does not correspond to the memory card. Therefore, security of data can be further increased.

Next, a second embodiment of the present invention will be described below.

When the IC card is used for the terminal, an automatic outtake mechanism must be provided because taking out the IC card is sometimes forgotten. In such a case, the IC card is sent out carelessly when the power is shut down. Therefore, there are many opportunities on which the IC card is stolen when the power failure is caused, and hence security of data is decreased.

The data processing system using an IC card, in which the above problem in the conventional technique can be eliminated, resulting in the IC card being rarely stolen and used, is shown in the second embodiment.

The data processing system according to the second embodiment includes the IC card and the terminal, to which the IC card is mounted and which performs data exchange with the IC card. The terminal is preferably provided with an IC card intake/outtake processing mechanism. By the IC card intake/outtake processing mechanism, the terminal receives the IC card such that the IC card cannot be taken out from the outside of the terminal when the IC card is inserted and sends out the IC card when the data processing system receives a signal representing a power on operation.

In this manner, since the IC card is taken in the IC card reader/writer while the IC card is mounted and cannot be taken out from the outside of the IC card reader/writer, the terminal can receive the IC card such that the IC card cannot be taken out from the outside of the terminal. Therefore, security can be increased. In addition, the IC card is not sent out when the power of the terminal equipment is shut down because of a power failure, or when the power is cut forcedly. As a result, the IC card remains inside the data processing system, and there is no occasion when a person can remove the IC card.

Therefore, opportunities for the IC card being fraudulently used can be decreased and security of the system using the IC card can be increased.

The second embodiment will be described below in detail, with reference to the accompanying drawings.

Figure 4:
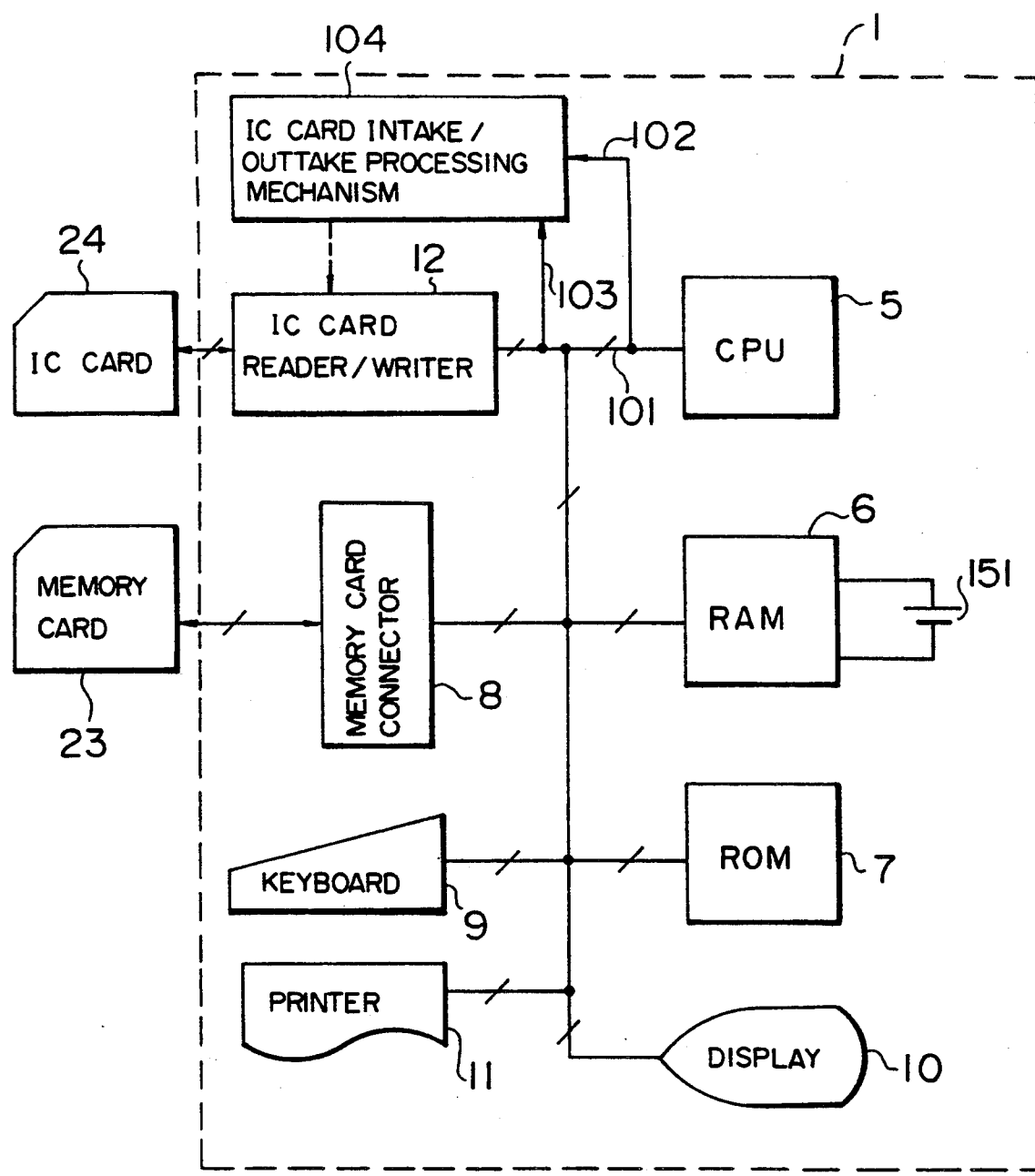
FIG. 4 is a block diagram showing an arrangement of a second embodiment of the data processing system using the IC card, to which system the present invention is applied.
Figure 5:
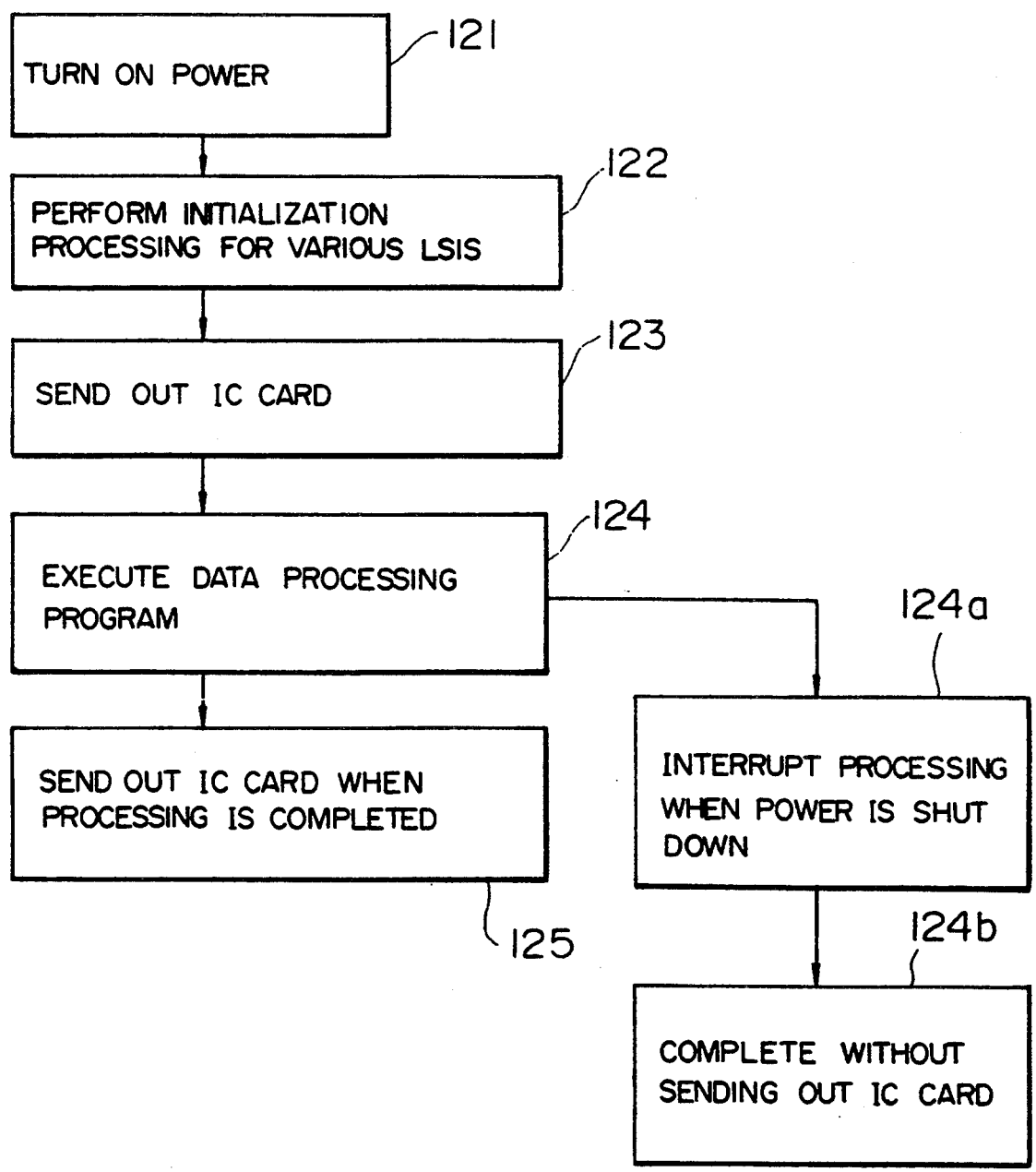

FIG. 4 is a block diagram showing an arrangement of the second embodiment of the data processing system using the IC card, and FIG. 5 illustrates an operation of the data processing system when the power of the terminal is turned on.

In FIG. 4, the same reference numerals as those in FIG. 1 indicate the same or equivalent components as those in FIG. 1.

In FIG. 4, a bus 101 is provided with a data bus, an address bus, and a control bus, and an application processing program and data, to be described later, are stored in the RAM 6 which is backed up by a battery 151.

Numeral 104 indicates the IC card intake/outtake processing mechanism which includes a transfer mechanism of the IC card and a drive mechanism for driving the transfer mechanism. The mechanism is controlled by signals on control lines 102 and 103 connected to the control bus of the bus 101 to carry the IC card into the inside of the data processing system and to carry it from the inside to the outside.

The IC card 24 is inserted and used in the terminal 1 and the IC card 24 mounted to the terminal 1 is taken in the inside of the IC card reader/writer 12, as shown by a broken line in FIG. 2. An IC card insertion port 31 has a cover closed except for when the IC card 24 is to be inserted, and even if the cover is open, the IC card taken in the inside cannot be taken out to the outside. Even if there is no cover, the data processing system must be provided with a structure by which the IC card cannot be taken out to the outside. The IC card 24 taken into the inside of the IC card reader/writer 12 once can be taken out only by driving the IC card intake/outtake processing mechanism 104.

The IC card intake/outtake processing mechanism 104, which is provided in the inside of the IC card reader/writer 12, detects the IC card 24 inserted into the IC card insertion port 31 and operates to direct the IC card 24 from the IC card insertion port 31 to a predetermined terminal contact position deep inside the IC card reader/writer 12. As shown by the broken line in FIG. 2, when the IC card is positioned at the predetermined terminal contact position, since the closest edge of the IC card 24 to the port 31 is positioned deep inside the terminal, the IC card cannot be taken out of the terminal. Numeral 8a indicates the memory card insertion port and deep inside the terminal is provided with the memory card connector 8.

With such a configuration, an operation of the data processing system is performed as hereinafter described. When a power switch (not shown) is turned on at a step 121 of FIG. 5 and the terminal 1 receives a signal representing the power being turned on, the CPU 5 performs initialization processing for internal registers, the keyboard 9, the printer 11, and the display 10 in a next step 122 in accordance with a processing program stored in the ROM 7.

Then, the IC card intake/outtake processing mechanism 104 is driven in step 123 to perform IC outtake processing. This processing is performed by transmitting a control signal for controlling outtake of the IC card 24 to the IC card intake/outtake processing mechanism 104 via the control signal line 102 by the CPU. In response to the control signal on the control signal line 102, the IC card intake/outtake processing mechanism 104 performs an operation for outtake of the IC card 24 to send out the IC card 24 from the IC card reader/writer 12 to the outside.

In response to a timing when the IC card is correctly sent out, a data processing program stored in the RAM 6 is started in a step 124, and the CPU 5 displays a message representing that the IC card 24 is to be mounted to the IC card reader/writer 12. In this case, when the data memory card 23 is not mounted to the memory card connector 8, a message representing this is also displayed. Then, a waiting loop for detecting that the IC card 24 is mounted is started. When the data memory card 23 is not mounted, a waiting loop for detecting that it is mounted is also started.

When the IC card 24 is inserted in the port of the IC card reader/writer 12, the CPU receives from the IC card reader/writer 12 a detection signal representing that the IC card is inserted. A command is outputted to the IC card intake/outtake processing mechanism 104 via the control signal line 103 for taking in the IC card 24 in the inside of the IC card reader/writer 12.

The IC card intake/outtake processing mechanism 104 takes the IC card 24 into the inside of the IC card reader/writer 12 and directs it to the predetermined terminal contact position. As a result, as shown in FIG. 2, the edge of the IC card 24 is directed into deep inside the terminal so that the IC card cannot be taken out.

When it is detected that the memory card 23 is mounted and the IC card 24 is mounted to the IC card reader/writer 12, the CPU 5 starts a confirmation information check processing program stored in the RAM 6. Next, the CPU loads the card identification information inherent to the IC card 24 and the card management information from the IC card 24, checks validity of the IC card based on these confirmation informations, and performs predetermined processing designated by an operator via the keyboard 9.

At a time when performance of the predetermined processing is completed, the CPU 5 outputs, at a step 125, a control signal for controlling outtake of the IC card to the IC card intake/outtake processing mechanism 104 via the control line 102 in response to a command from the keyboard 9 or automatically such that the processing mechanism 104 performs processing for outtake of the IC card which is mounted in the IC card reader/writer 12. Note that an alarm (not shown) may be generated at this time such that an operator receives the IC card 24.

Therefore, in a usual processing state, the IC card is not stolen or lost unless the the IC card 24, which is taken out from the terminal 1, is mislaid.

In this manner, when the processing based on the data processing program is normally completed, the control signal is outputted via the control signal line 102 to the processing mechanism 104 such that control for outtake of the IC card 24 is performed. When the power is shut down before the processing based on the data processing program is completed, the flow advances to steps 124a and 124b and the IC card is retained inside the IC card reader/writer 12 since the CPU 5 does not transmit a signal for outtake of the IC card 24 to the IC card reader/writer 12.

As a result, since the IC card 24 is not sent out from the IC card reader/writer 12 to the outside even if the failure of the power is caused while an operator is away far from the terminal 1 during the data processing, or even if the power is turned off by another person, where the IC card is not taken out. In addition, when the power is turned on, the IC card retained in the IC card reader/writer 12 is sent out, so that there is no case where the IC card is forgotten and carelessly retained.

The processing for outtake of the IC card upon the power being turned on may be performed such that it is checked whether nor not the IC card is mounted in the IC card reader/writer and the IC card is sent out from the IC card reader/writer when it is detected that the IC card is mounted.

Next, a third embodiment of the present invention will be described below.

In the third embodiment, the operativity of the data processing system is increased by configuring it such that each of the IC card and the memory card is detachable from the terminal. In addition to the above, in order to increase security of data, two types of confirmation information are provided. Coincidence determination processing is performed for confirmation information stored in the IC card in two stages, i.e., a stage for determining coincidence of the confirmation information stored in the IC card with confirmation information stored in the terminal and then a stage for determining it with confirmation information stored in the memory card. As a result, validity of data processing can be checked. Therefore, the data processing as an object is not performed unless the confirmation information stored in the terminal, the memory card, and the IC card coincide with each other. Thus, security of the data processing can be increased.

The third embodiment of the present invention will be described below in detail with reference to the accompanying drawings.

Figure 6:
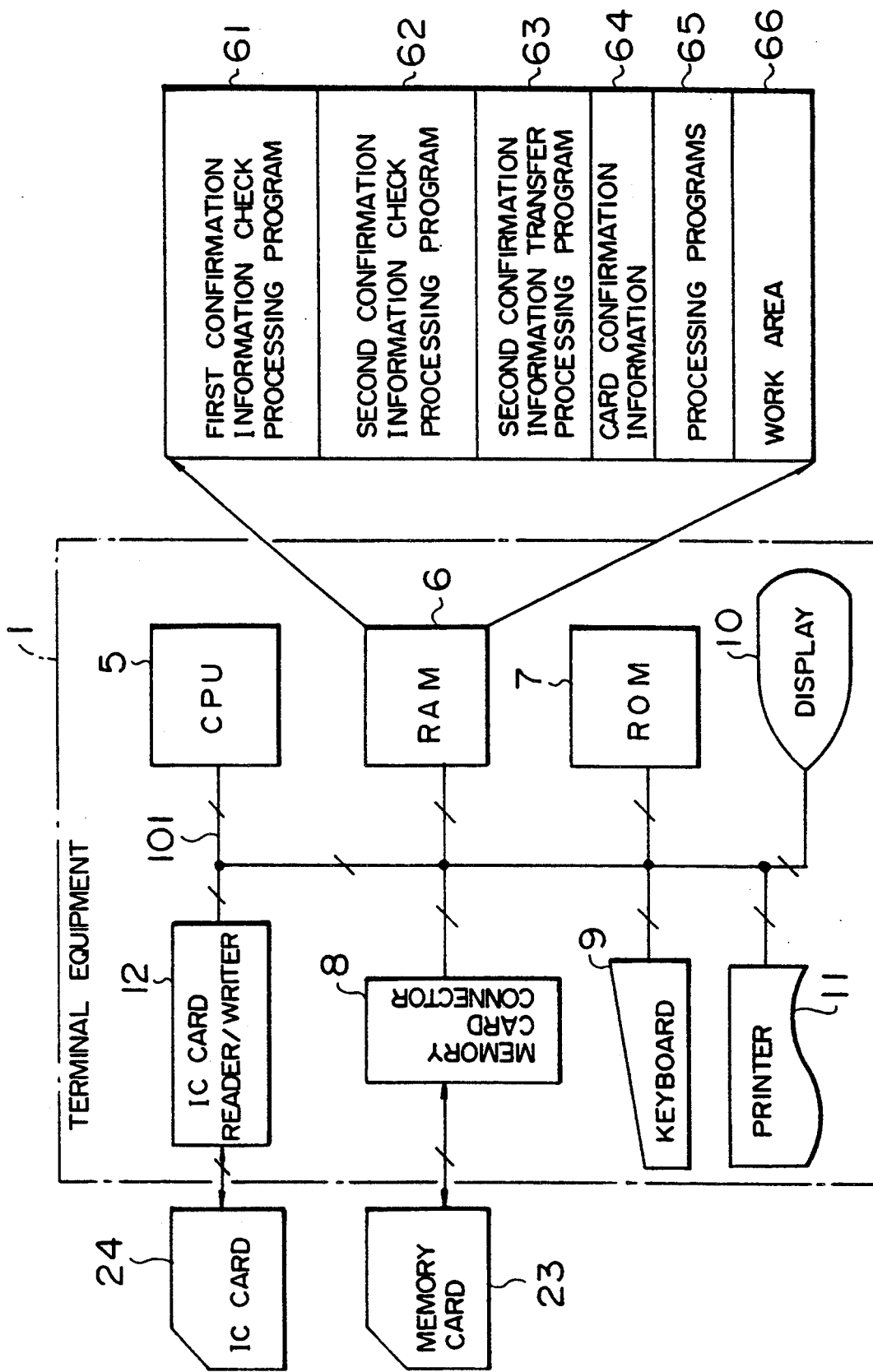
FIG. 6 is a block diagram showing an arrangement of a third embodiment of the data processing system using the IC card, to which system the present invention is applied.
Figure 7:
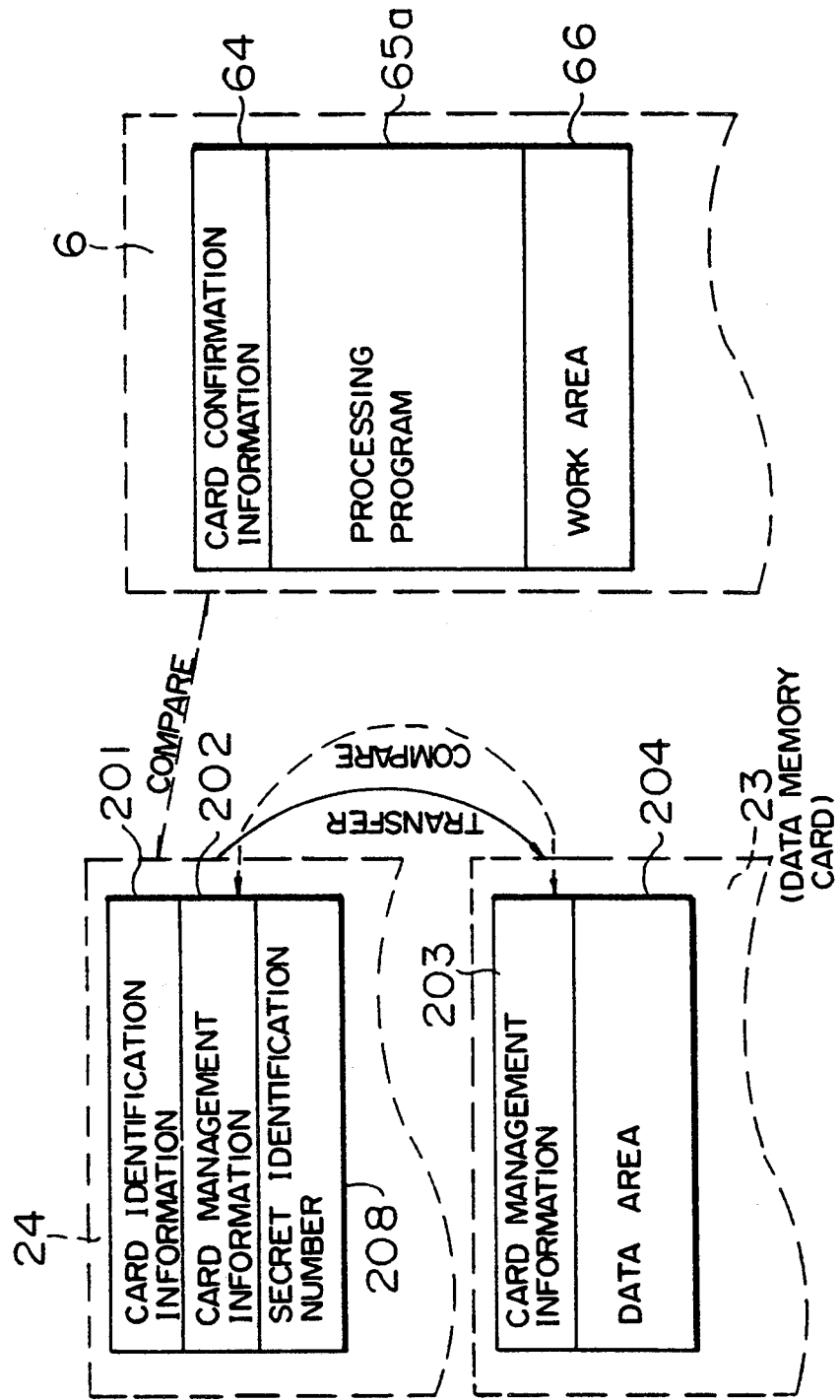
FIG. 7 are memory maps for explaining information stored in the terminal in the data processing system shown in FIG. 6.
Figure 8:
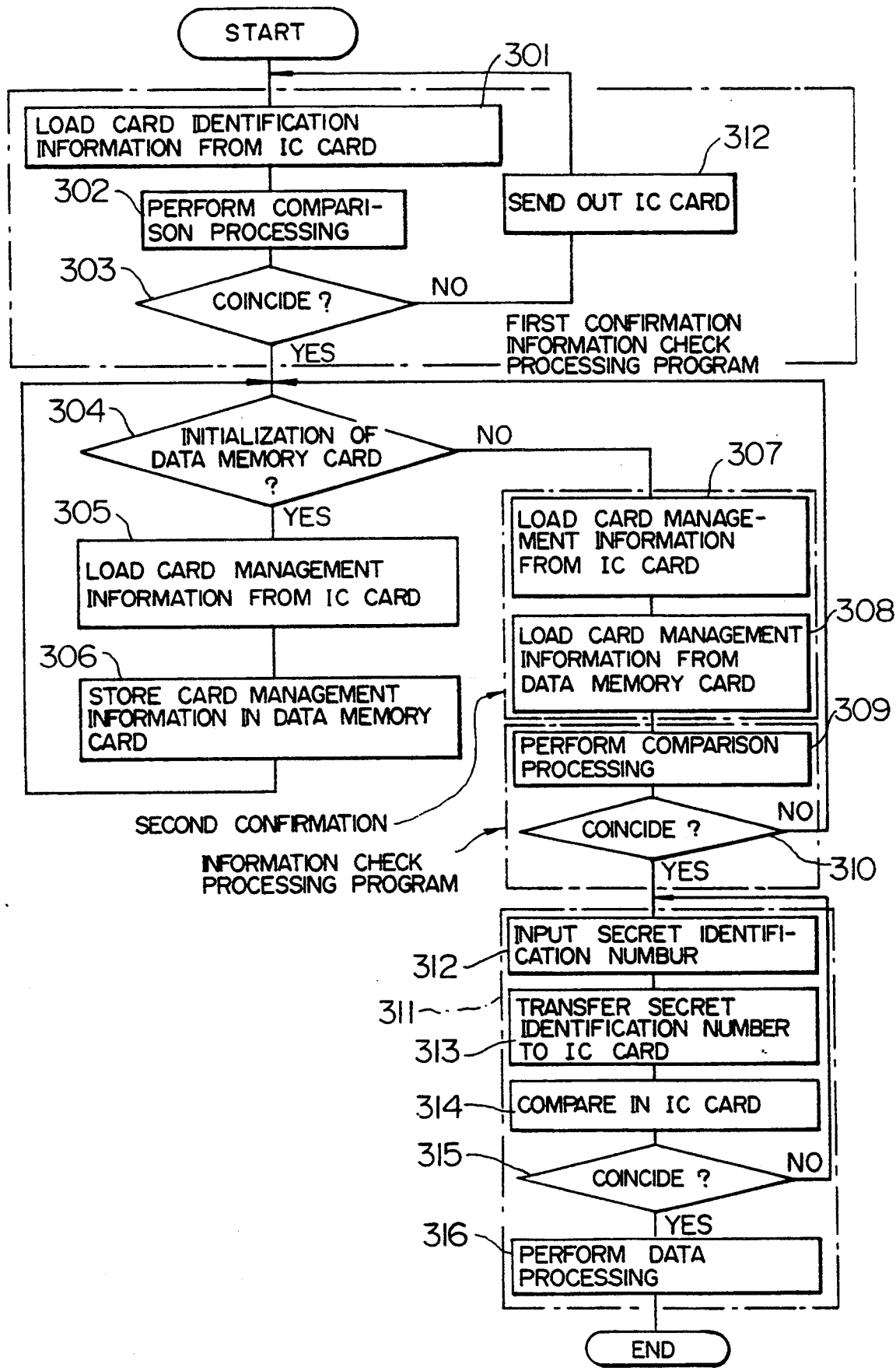
FIG. 8 is a flow chart for explaining an operation of the data processing operation shown in FIG. 6.

FIG. 6 is a block diagram showing an arrangement of the data processing system using an IC card according to the third embodiment. FIG. 7 are memory maps showing the three sets of confirmation information stored in the IC card, the memory card, and the terminal as main portions. FIG. 8 is a flow chart for explaining an operation of the third embodiment.

In FIG. 6, the same reference numerals as those in FIG. 1 indicate the same or equivalent components as those in FIG. 1.

In FIG. 6, a determination processing program used in the determination processing for determining whether or not the secret identification numbers coincide with each other is stored in a ROM and/or a RAM (both not shown) of the IC card 24. As shown in FIG. 7, in the ROM are also stored card identification information 201 as first confirmation information and card management information 202 as second confirmation information, which are required to confirm validity of the IC card.

With such a configuration, the terminal 1 operates as described hereinbelow.

First, the CPU 5 receives information input from the keyboard 9 and starts a start processing program 65a of the processing programs 65 to perform the operations shown in FIG. 8. The program 65 is stored in the RAM 6, as shown in FIG. 7.

That is, when the information is first inputted from the keyboard 9, the CPU 5 causes the display units 10 to display a message representing that the IC card is to be mounted to the IC card reader/writer 12. In this case, when the data memory card 23 is not yet mounted to the memory card connector 8, a message representing this is also displayed. Then, a waiting loop for detecting that the IC card 24 is mounted is started. If the memory card 24 is not mounted, another waiting loop for detecting that the memory card is mounted is also started.

When it is detected that the memory card 23 is mounted to the terminal 1 and that the IC card is mounted to the IC card reader/writer 12, the CPU 5 starts a first confirmation information check processing program 61, which is stored in the RAM 6, at a step 301 to load the card identification information 201 inherent to the IC card 24 from the IC card 24 in accordance with the program 61. For example, this card identification information is a special string of characters which is defined by a user such as an enterprise using the terminal 1, and more particularly, the card identification information corresponds to a string of characters for identifying a bank or the like which issued the IC card. At a next step 302, the loaded card identification information 201 is compared with card confirmation information stored at a predetermined storage area of the RAM 6 and the compared result is stored at another predetermined storage area of the RAM 6 as flag information (a comparison result flag). Note that the card confirmation information 64 has been read out from the program memory card and stored in the RAM 6 as a part of program data, when the power of the terminal 1 is turned on after the program memory card 21 or 22 is mounted or when the program card 21 or 22 is mounted after the power is turned on.

At a next step 303, the above comparison result flag is referred to. When the flag represents that these items of information coincide with each other, a YES condition is satisfied. At this time, the CPU 5 executes to a next processing step of the start processing program 65a and the flow advances to the processing of a step 304. When the flag represents that these items of information do not coincide with each other, as a result of reference to the comparison result flag, a NO condition is satisfied. At this time, a program to be executed by the CPU 5 is changed from the start processing program 65a to a IC card sending out processing program of the processing programs 65 and the CPU 5 commands the IC card reader/writer 12 to perform processing for sending out the mounted IC card 24. Thereafter, the flow returns to the start processing step of the step 301.

When the card identification information 201 and the card confirmation information 64 coincide with each other, the CPU 5 performs at a step 104 determination processing for waiting for information input from the keyboard 9 and determining whether or not the input information is initialization information of the data memory card 23. When a YES condition is satisfied in the determination processing of the step 304, i.e., when the input information is for initializing the memory card 23, the flow advances to the processing of a step 305 and the CPU 5 loads card management information shown in FIG. 7 from the IC card 24. The card management information is management information for classifying IC cards having the same card identification information 201 and given as a serial number such as one of identification numbers assigned to IC cards issued from an identical bank in order of the issued IC cards.

The CPU 5 starts a second confirmation information transfer processing program 63 at a step 305 to load the card management information 202. The loaded information 202 is transferred from the terminal 1 to the data memory card 23 via the memory card connector 8 at a step 306 in accordance with the program 63 and stored at a predetermined storage area of the card 23 assigned in advance as card management information 203 of the IC card 24. After predetermined initialization processing such as formatting is performed for the data memory card 23 shown in FIG. 7, the flow returns to the step 304 and the CPU 5 waits for next information input from the keyboard 9. In this manner, the card management information 202 which is stored in the IC card 24 and is inherent to the IC card is written and held in the data memory card 23 as the card management information 203. Note that, when completion information is inputted from the keyboard 9 at the step 304, the above load and transfer processing is completed and only the initialization processing can be performed independently.

Next, at a time different from the time when the above initialization processing is performed, if the data memory card 23 and the IC card 24 are mounted to the terminal 1, the first confirmation information check processing program 61 is executed and then the flow advances to the step 304. Since the initialization processing of the data memory card 23 is already performed until this time, a predetermined processing code for processing except for the initialization processing is inputted from the keyboard 9. Note that the processing of the step 304 may be performed subsequent to the above initialization processing.

As a result, when the NO condition is satisfied in the determination processing of the step 304, the flow advances to a step 307 and the CPU 5 loads the card management information 201 from the IC card 24. At a step 308, the CPU 5 loads the card management information 203 from the data memory card 23. The two items of card management information 201 and 203 are compared with each other at a step 309 and the compared result is stored at a predetermined storage area of the RAM 6 as flag information (a comparison result flag).

When the comparison result flag is referred to, a YES condition is satisfied at a step 310 if the flag indicates that the two items of card management information coincide with each other. At this time, the CPU 5 performs secret identification number inquiry processing of a step 311. When the comparison result flag is referred to, a NO condition is satisfied there, if the flag indicates that the items of card management information do not coincide with each other. At this time, the CPU 5 causes the display 10 to display a message representing the noncoincidence and the flow returns to the step 304.

In order to perform the secret identification number inquiry processing when two items of card management information coincide with each other, the flow advances to a step 312. At the step 312, the CPU 5 causes the display unit 10 to display a message commanding input of a secret identification number in accordance with one of the processing programs 65 and enters a waiting state for input of the secret identification number. When the secret identification number is inputted, it is transferred to the IC card 24 at a step 313. When the secret identification number is transferred, the IC card compares the transferred identification number with a prestored secret identification number 208 shown in FIG. 7 to determine whether or not the secret identification numbers coincide with each other. The compared result representing coincidence or noncoincidence is transferred to the terminal 1. After the terminal 1 receives the compared result via the IC card reader/writer 12 and confirms the coincidence between the secret identification numbers, the terminal 1 starts the data processing at a step 316 in accordance with information already inputted at the step 304.

Note that, in the data processing of the step 316, various types of data stored in the data memory card 23 are used. Therefore, it is a condition for permitting the CPU 5 to access the data memory card 23 in accordance with the following data processing program that the two stages of the confirmation information inquiry processing are passed prior to the step 316 on the basis of the card identification information 201 and the items of card management information 202 and 203. Only when the coincidences are obtained in the two stages of the inquiry processing, the terminal 1 can enter, continue, perform, and then complete the data processing. In addition, when the secret identification numbers do not coincide with each other as a result of the inquiry processing of the secret identification number in the IC card 24, the flow returns to the step 312 until the number of noncoincidences reaches a predetermined number. When the coincidence is not obtained until the number of noncoincidences reaches the predetermined number, the data processing is completed.

A work data area necessary for performing the first confirmation information and the second confirmation information check processing programs 61 and 62, the second confirmation information transfer processing program 63, and the various processing programs 65 is provided in a work area 66 of the RAM 6. The information necessary for performing the data processing by the terminal 1 is stored in a data area 204 of the data memory card 23. The information, which is inputted from the keyboard 9 in accordance with one of the processing programs 65, may be stored in the data area 204 of the data memory card 23 via the memory card connector 8.

As described above, in the embodiment, the first and/or second confirmation information is stored in the IC card 24, the data memory card 23, and the processing programs 65, and various types of check processing can be performed by the terminal 1 before the data processing program is conventionally executed. In addition, the IC card 24 and the memory card 23 are detachable from the terminal 1. Therefore, there is the expandability that these can be freely exchanged and used. Further, as described above, the first confirmation information in the IC card 24 and the card confirmation information in the terminal 1 are checked to prevent fraudulent use of another IC card, and the second confirmation information in the data memory card 23 and the IC card 24 are checked to inhibit use of another memory card which does not correspond to the IC card 24. That is, the terminal cannot start the data processing if the program memory card, whose programs are stored in the terminal 1, the IC card, and the data memory card do not correspond to each other. Therefore, security of data can be increased.

Even if the secret identification number 208 of the IC card is stolen and used, the terminal 1 cannot be used if there are not the IC card corresponding to the programs and the data memory card initialized by the IC card.

As described above, in the embodiment, the first confirmation information check processing is performed and then the second confirmation information check processing is performed, as shown in FIG. 8. However, the order of the check processing may be reverse and there may be processing for not accessing the data memory card between the first and second confirmation information check processing.

In addition, the first and second confirmation information check processing programs, and the second confirmation information transfer processing program may be stored in the ROM 7 as independent programs separated from the processing programs.

Further, the first confirmation information may be transferred from the IC card into the first confirmation information check processing program in the terminal by the CPU 5 in advance when the power is turned on or when the IC card is used after the power of the data processing system is turned on.

In the above embodiment, one example is described, wherein one item for each of the first and second confirmation information is provided. However, plural items for each confirmation information may be provided such that a plurality of IC cards and data memory cards can be inquired. In addition, these inquiry processing may be applied to the program memory card. The program memory card and the data memory card may be made as one unit.

In this embodiment, the first confirmation information and second confirmation information are provided in the IC card and one of them is transferred to the data memory card. However, the first and second confirmation information may be provided in the data memory card and one of them may be transferred to the IC card. In addition, if the first confirmation information is stored in one of the IC card and the memory card and the second confirmation information is stored in the other, the second confirmation information may be transferred from the other to the one.

Next, a fourth embodiment of the present invention will be described below.

In the fourth embodiment, a case is considered wherein the terminal can be used by a plurality of users and it is often required that each of processing data of the plurality of users is displayed on the display or printed in order for each user to confirm the current processing data or grasp all the processing data. In such a case, a secret identification number or the like corresponding to each user (or a dealer, and the term "user" includes the dealer in this specification) is often used to classify and clear data concerning the user. Therefore, the risk that the secret identification number is stolen and used becomes great to that extent.

According to the fourth embodiment, the above-described drawback that it is easy to fraudulently use data for a conventional terminal, which is used in a financial institution, can be eliminated and security of data processing in the terminal can be increased.

In the case where a plurality of users commonly use an IC card, user identification information and operation history information are stored and managed in the IC card in correspondence with operator history data for specifying a user using the terminal. When the IC card is used by one of the plurality of users, these items of information are outputted in accordance with the operator history data for the user. Therefore, fraudulent use of the IC card among the plurality of users can be prevented. In addition to this, when the IC card is used by a user, user identification information or the like is outputted in place of the secret identification number. Therefore, the secret identification number is not outputted from the IC card to an external unit, and opportunities that the secret identification number can be stolen and used are decreased. And, hence security of the entire terminal can be increased.

The fourth embodiment of the present invention will be described below with reference to the accompanying drawings.

Figure 9:
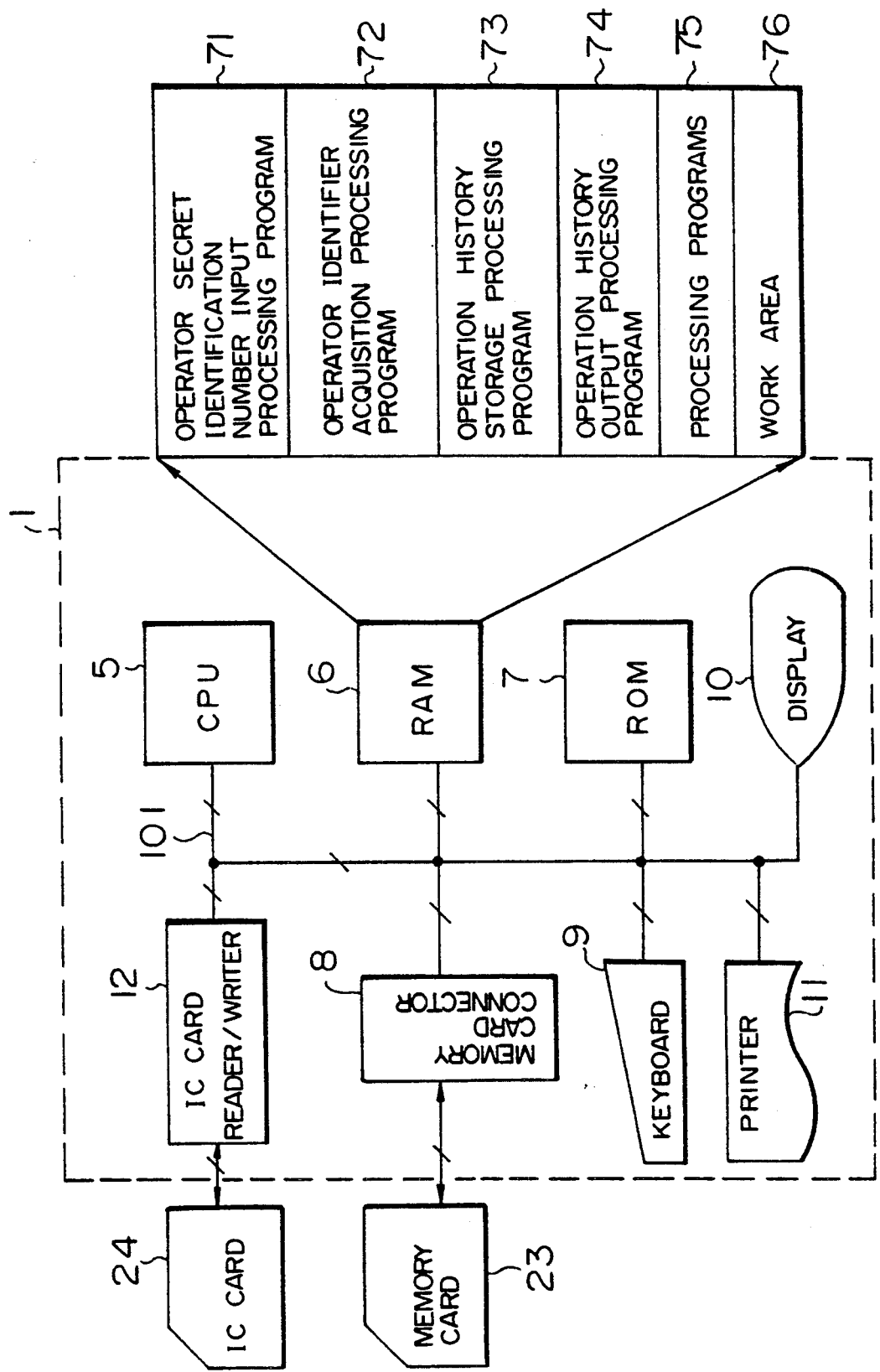
FIG. 9 is a block diagram showing an arrangement of a fourth embodiment of the data processing system using an IC card, to which system the present invention is applied.
Figure 10:
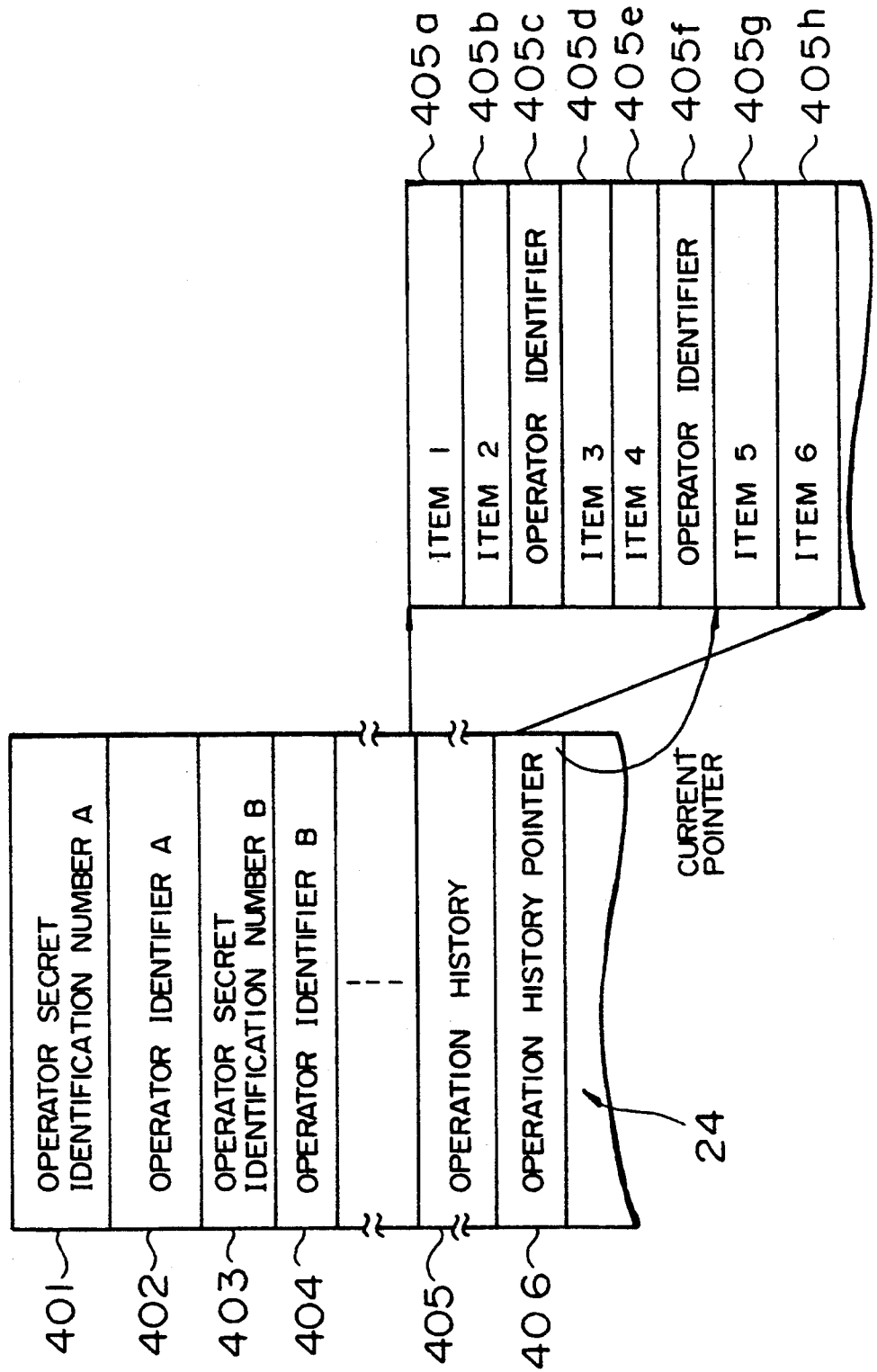
FIG. 10 is a memory map in the IC card of the data processing system shown in FIG. 9.
Figure 11:
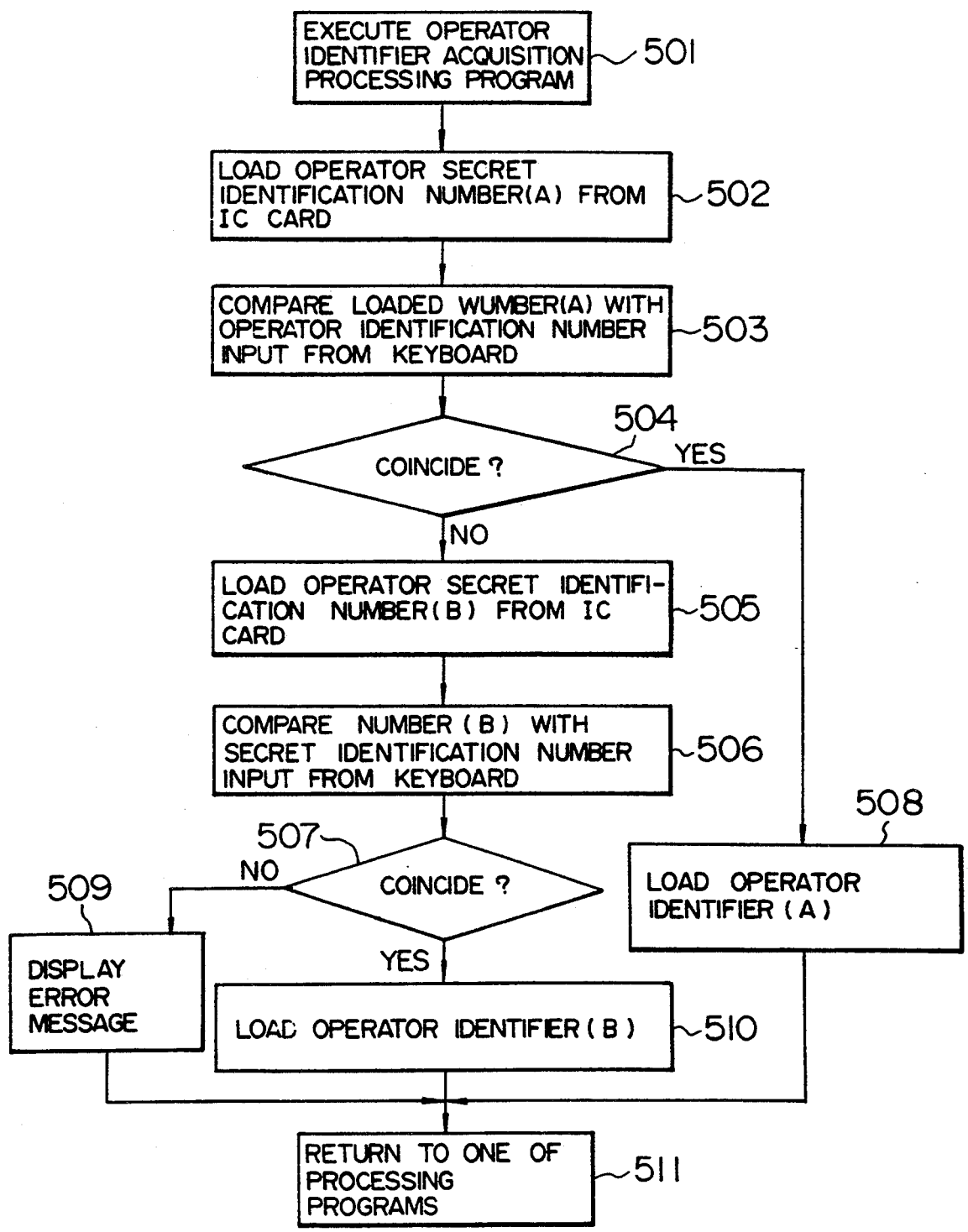
FIG. 11 is a flow chart for explaining an operation of the data processing system shown in FIG. 9.

FIG. 9 is a block diagram showing an arrangement of the fourth embodiment. FIG. 10 is a memory map of the IC card. FIG. 11 is a flow chart for explaining an operation of the terminal.

In FIG. 9, the same reference numerals as those in FIG. 1 indicate the same or equivalent components as those in FIG. 1.

In FIG. 9, an operator secret identification number input processing program 71, an operator identifier acquisition processing program 72, an operation history storage processing program 73, an operation history output processing program 74 and processing programs 75 (including the card confirmation information) are read out from the program memory card 23 by the CPU 5 in accordance with a program load processing program stored in the ROM 7 and transferred to and stored in the RAM 6.

The card identification information for confirming validity of the IC card 24 and the card management information as the second confirmation information are registered in an EEPROM (not shown) in the IC card 24. As shown in FIG. 10, an operator secret identification number as confirmation information for a person having authority for using the IC card 24 and an operator identifier as identification information, which is provided separate from the secret identification number, for managing dealing states of the person as an internal operation history in correspondence with the confirmation information, are preregistered in the IC card 24, as an operator secret identification number (A) 401, an operator identifier (A) 402, an operator secret identification number (B) 403, an operator identifier (B) 404, and the like, when the IC card 24 is issued.

Note that, a work area 76 shown in FIG. 9 is ensured in the RAM 6 such that the CPU 5 can perform various processing.

With such a configuration, the terminal 1 operates as follows.

First, the CPU 5 receives information input from the keyboard 9 and starts a start processing program of the processing programs 75 in the RAM 6 to start the processing described hereinbelow.

More specifically, when the information is first inputted from the keyboard 9, the CPU displays on the display 10 a message representing that the IC card 24 is to be mounted to the IC card read reader/writer 12. In this case, if the data memory card 23 is not mounted to the memory card connector 8, a message representing this is displayed. Then, a waiting loop for detecting that the IC card 24 is mounted is started. When the memory card 23 is not mounted, a waiting loop for detecting that the memory card is mounted is also started.

When the CPU 5 detects that the memory card 23 is mounted and the IC card 24 is mounted in the IC card reader/writer 12, the CPU 5 starts to execute a card confirmation processing program of the processing programs 75 stored in the RAM 6 to check validity of the IC card 24 and then determines whether or not the memory card 23 is initialized. When it is determined that the memory card 23 is not initialized, the CPU 5 performs initialization processing for the data memory card.

Note that information for card confirmation in the terminal 1 for the IC card 24 is read out from the program memory card and stored in the RAM 6 as a part of processing program data when the power of the terminal 1 is turned on after the program memory card is mounted or when the program memory card 21 or 22 shown in FIG. 1 is mounted after the power is turned on. In addition, the CPU 5 initializes hardware in accordance with a program stored in the ROM 7 when the power of the terminal 1 is turned on.

When the above initialization processing is performed after the power is turned on and the memory card 23 which is already initialized is mounted, the CPU 5 in the terminal 1 starts one or more of the processing programs 75 and goes to a state in which information input from the keyboard 9 can be received. When the processing for accessing the IC card 24 is designated by an operator via the keyboard 9, the CPU 5 starts an operator secret identification number input processing program 71 to display on the display 10 a guidance representing that a secret identification number is to be inputted and transfers the secret identification number input via the keyboard 9 to the IC card 24 via the IC card reader/writer 12.

The IC card 24 determines by a microprocessor (not shown) in the inside whether or not the operator secret identification number coincides with the identification number stored in the inside. When coincidence is obtained, the microprocessor permits the CPU 5 to access the IC card 24 thereafter.

Each time the operator operates the terminal 1 to perform data processing in units of predetermined processing, history information such as an operator identifier, input date, input data, and processing resultant data are transferred from the terminal 1 to the IC card 24 and sequentially stored in the storage area for the operation history 405. This processing is performed by starting an operator identifier acquisition processing program 72 and an operation history storage processing program 73, when the data processing is started in accordance with one of the processing programs 75.

The processing on the basis of the operator identifier acquisition processing program is performed in accordance with a flow chart shown in FIG. 11. A case wherein the number of users is two and two operator secret identification numbers (A) and (B) are registered for the two users, for convenience of explanation, will be described below. Note that there may be further operator secret identification numbers as the secret identification numbers. Here, it is assumed that an operator identifier corresponding to the operator secret identification number is stored in accordance with a predetermined rule, e.g., an adjacent address rule.

In FIG. 11, the operator identifier acquisition processing program 72 is first started at a step 501 in accordance with one of the processing programs 75. At a step 502, the CPU 5 gets the IC card 24 to transfer the operator secret identification number (A) to the CPU 5, in accordance with the operator identifier acquisition processing program 72 to load the same. The CPU 5 compares the secret identification number inputted from the keyboard 9 in advance with the operator secret identification number (A) 401 in the processing of a step 503 and stores the compared result as flag information (a comparison result flag) at a predetermined storage area of the RAM 6.

At a next step 504, the above comparison result flag is referred to. When the flag represents coincidence, a YES condition is satisfied. At this time, the flow advances to a step 508 and the CPU 5 gets, at the step 508, the operator identifier (A) 402 corresponding to the operator secret identification number (A) 401 from the IC card 24 to load the same. Thereafter, the flow returns to a step 511 and the CPU 5 executes one of the processing programs 75 at the step 511.

When the comparison result flag represents noncoincidence as a result of reference to the flag obtained at the step 504, a NO condition is satisfied. At this time, the CPU 5 loads the operator secret identification number (B) 403 from the IC card 24 at a step 505, and compares the secret identification number input from the keyboard 9 with the operator secret identification number (B) 403 at a step 506 to store the comparison result flag representing the compared result in the RAM 6. When the flag represents coincidence between both the secret identification numbers at a step 507, the flow advances to a step 510. At the step 510, the CPU 5 loads the operator identifier (B) 404 corresponding to the operator secret identification number (B) 403 from the IC card 24 and then executes one of the processing programs 75. When the flag represents that coincidence between both the secret identification numbers is not obtained, the CPU 5 causes the display 10 to display an error message at a step 509 and then executes one of the processing programs 75 at the step 511 so that the CPU 5 is set to an initial state.

When either the operation identifier (A) or (B) is obtained in accordance with the operator identifier acquisition processing program 72, a next program in the processing programs is executed at the step 511 and the processing designated by the operator is performed. When the designated processing is completed, the operation history storage processing program 73 is started. By executing this processing program 73, the CPU 5 refers to an operation history pointer 406 in the IC card 24 and transfers an operation history to the IC card 24 such that the operation history is stored in a storage area of the operation history 405 in the IC card 24, as described hereinbelow.

In FIG. 10, for example, three or more histories may be stored in the operation history 405. A location for a next history to be stored is indicated by the operation history pointer 406.

An operation history storage processing program 73 takes over items 1 and 2 and the operator identifier used in the data processing from the processing programs 75. In accordance with the operation history storage processing program 73, the CPU 5 stores the items 1 and 2 and the operator identifier in the IC card 24 from a location indicated by the pointer 406 in order of 405a→405b→405c→405d→405e→405f→405g→405h and then executes one of the processing programs 75 after the CPU 5 updates the pointer 406 to a next storage start address.

In this manner, the operation history information can be stored in the IC card 24 in correspondence with the operator by way of the operator identifier.

Next, when the terminal 1 receives a history data print out command from the operator, the CPU 5 starts an operation history output processing program 74 in accordance with one of the processing programs 75 and output the operation history 405 to the printer 11 or the display 10 in accordance with the processing program 74.

In accordance with the operation history output processing program 74, the CPU 5 reads out the operation history pointer 406 from the IC card 24, sequentially goes back the history data from the location indicated by the operation history pointer 406 to load the history data from the IC card 24 together with the operator identifier, and output the loaded data to the printer 11 or the display 10. Note that, when only the history data corresponding to a specific user, i.e., a specific secret identification number in other words, is to be outputted, it is not necessary to print out the operator identifier.

Here, when the history data are stored in all the storage areas of the operation history 405, next history data is stored at the storage area in which the earlier history data is stored, e.g., at the head of the storage area in the embodiment. Therefore, only the latest history data can be managed.

As described above, in the fourth embodiment, the history data is outputted together with the operator identifier. However, different identification information such as a name may be outputted in place of the operator identifier. In such a case, it is required that conversion data between the operator identifier and the name is stored in the terminal 1 or the IC card 24.

In the fourth embodiment, it is described that the operator identifier acquisition processing program 72 is stored in the RAM 6 and started by the CPU 5. However, the program 72 may be stored in the IC card 24 and the data processing system may be configured such that, when the IC card 24 receives the input operator secret identification number, the IC card 24 compares the received number with the stored operator secret identification number to determine whether or not the numbers coincide, and that the operator identifier corresponding to the operator secret identification number is outputted to the terminal 1 together with the coincidence response.

The operator secret identification number and the operator identifier may be stored in the IC card by another IC card issuing system, or the CPU 5 may access the IC card in response to the coincidence response between the secret identification numbers from the IC card to store the operator secret identification number and the operator identifier in the IC card if a program for adding or changing processing of the secret identification number and the identifier is stored in the RAM 6 in the data processing system according to the present invention.

Further, the correspondence relation of the operator secret identification number with the operator identifier is not limited to the embodiment.

INDUSTRIAL APPLICABILITY

As described above, the data processing system according to the present invention can be utilized for a data processing system in a financial institution or a reservation system for a ticket or a hotel, and more particularly, is effective for the processing system using a communication line.

We claim:

1. A data processing system using an IC card comprising:
    a central computer for performing data processing;
    said IC card for storing confirmation information, said confirmation information including identifying information of an IC card owner; and
    a terminal connected to said central computer through a communication line, said terminal including means for mounting said IC card,
    input means for entering input information,
    internal memory means for storing transaction information for data processing between the IC card owner and said central computer, and
    processor means connected to said mounting means and said internal memory means, for performing processing in said terminal;
    wherein said processor means permits said IC card to access the transaction information stored in said internal memory means so that said IC card can designate an information part stored therein or perform processing on an information part stored therein to obtain a synthesized data part, upon a coincidence determination being made that said input information entered by said input means coincides with said confirmation information in said IC card, and
    said processor means performs processing on the synthesized data part or the designated information part, and transfers a processing result to said central computer via said communication line.

2. The data processing system using an IC card according to claim 1, wherein said coincidence determination is performed by said IC card.

3. The data processing system using an IC card according to claim 1, wherein said coincidence determination is performed by said processor means.

4. A data processing system using an IC card, comprising:
   a central computer for performing data processing;
   said IC card for storing confirmation information, said confirmation information including identifying information of an IC card owner;
   memory card means for storing transaction information for data processing between the IC card owner and said central computer; and
   a terminal connected to said central computer through a communication line, said terminal including
   means for mounting said IC card,
   means for mounting said memory card means,
   input means for entering input information,
   internal memory means, and
   processor means connected to said mounting means and said internal memory means, for performing processing in said terminal;
   wherein said processor means loads the transaction information from said memory card means into said internal memory means,
   said processor means then permits said IC card to access the transaction information stored in said internal memory means so that said IC card can designate an information part stored therein or perform processing on an information part stored therein to obtain a synthesized data part, upon a coincidence determination being made that said input information entered by said input means coincides with the confirmation information in said IC card, and
   said processor means performs processing on the synthesized data part or the designated information part, and transfers a processing result to said central computer via said communication line.

5. The data processing system using an IC card according to claim 4, wherein said coincidence determination is performed by said IC card.

6. The data processing system using an IC card according to claim 4, wherein said coincidence determination is performed by said processor means.

7. The data processing system using an IC card according to claim 4, wherein a processing program executed by said processor means is loaded from the memory card means by said processor means.

8. The data processing system using an IC card according to claim 4, wherein said memory card means comprises:
   a first memory card for storing the processing program; and
   a second memory card for storing the transaction information concerning the IC card owner.

9. The data processing system using an IC card according to claim 8, wherein said second memory card has a storage area for storing a registered account of the IC card owner and a storage area for storing a money movement history.

10. An IC card data processing system comprising a terminal device including an internal memory storing transaction information for data processing and an inputting means for entering input information, a communication line, said communication line being connected to said terminal device and an IC card, said IC card being mounted on said terminal device and storing confirmation information and at least one information part, wherein a part of said transaction information to be stored in said IC card is stored in said internal memory, said part of said transaction information stored in said internal memory is designated by said IC card, access of said IC card is performed by said terminal device in accordance with a coincidence determination being made that the input information inputted by said input means coincides with the confirmation information stored in said IC card, and synthesized information is generated based on said part of said transaction information in said internal memory designated by said IC card and said at least one information part from said IC card, and is transferred to said line with a predetermined format.

11. An IC card data processing system comprising a terminal device including an internal memory storing transaction information for data processing and an inputting means for entering input information, a communication line, said communication line being connected to said terminal device and an IC card, said IC card being mounted on said terminal device and storing confirmation information and at least one information part, wherein a part of said transaction information to be stored in said IC card is stored in said internal memory of said terminal device, said part of said transaction information stored in said internal memory is accessed by said IC card and predetermined data processing is performed thereon, access of said IC card is permitted by said terminal device in accordance with a coincidence determination being made that the input information inputted by said input means coincides with the confirmation information stored in said IC card, and synthesized information is generated based on said part of said transaction information in said internal memory designated by said IC card and said at least one information part from said IC card, and is transferred to said line with a predetermined format.

12. An IC card data processing system comprising a terminal device including an internal memory, and an inputting means for entering input information, and a memory card, said memory card storing transaction information for data processing and being mounted on said terminal device, a communication line, said communication line being connected to said terminal device, and an IC card, said IC card being mounted on said terminal device and storing confirmation information and at least one information part, wherein a part of said transaction information to be stored in said IC card is stored in said memory card, said part of said transaction information is transferred from said memory card to said internal memory upon being accessed by said IC card, or said part of said transaction information stored in said memory card is accessed by said IC card to perform a predetermined data processing, access of said IC card is permitted by said terminal device in accordance with a coincidence determination being made that the input information inputted by said input means coincides with the confirmation information store in said IC card, and synthesized information is generated based on said part of said transaction information in said internal memory designated by said IC card and said at least one information part from said IC card, and is transferred to said line with a predetermined format.

13. An IC card data processing system comprising an IC card and a memory card either one of which has first confirmation information and second confirmation information, and having card confirmation information for confirming right of one of said IC card and said memory card, said IC card and said memory card being mounted on said system, and coincidence between said first confirmation information read out from said either one of said IC card and said memory card and said card confirmation information being detected to transfer said second confirmation information to the other of said IC card and said memory card, wherein, when said system performs predetermined processing, said system detects coincidence between said card confirmation information and said first confirmation information, after detecting the coincidence, said system further detects coincidence between said second confirmation information of said either one of said IC card and said memory card and the second confirmation information transferred to the other, so that said system starts the predetermined processing when said system detects the coincidence of said second confirmation information.

14. The IC card data processing system according to claim 13, wherein said either one card is the IC card, said first confirmation information is confirmation information for confirming right of the IC card.

15. The IC card data processing system according to claim 13, wherein one of said IC card and said memory card has said first confirmation information, while the other has said second confirmation information, after detecting the coincidence between said first confirmation information and said card confirmation information, said system transfers said second confirmation information from said the other card to said either one card.

16. The IC card data processing system according to claim 14, wherein one of said IC card and said memory card has said first confirmation information, while the other has said second confirmation information, after detecting the coincidence between said first confirmation information and said card confirmation information, said system transfers said second confirmation information from said the other card to said either one card.

* * * * *

UNITED STATES PATENT AND TRADEMARK OFFICE
CERTIFICATE OF CORRECTION

PATENT NO. : 5,367,150
DATED : November 22, 1994
INVENTOR(S) : Kitta et al.

It is certified that error appears in the above-indentified patent and that said Letters Patent is hereby corrected as shown below:

Title page,
Item 22, change "PCT Filed: Sep. 25, 1989" to read --Filed: July 22, 1992--;

Item 86, delete in its entirety; and

Item 87, delete in its entirety.

Signed and Sealed this

Thirtieth Day of May, 1995

*Attest:*

BRUCE LEHMAN

*Attesting Officer*   *Commissioner of Patents and Trademarks*